G. E. CLEVELAND.
CONTAINER.
APPLICATION FILED FEB. 15, 1909.
950,475.
Patented Mar. 1, 1910.
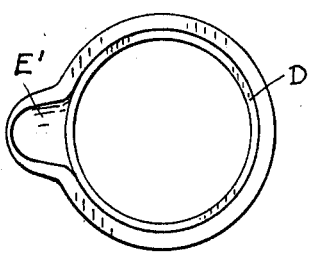
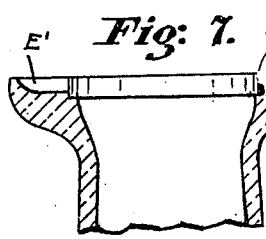
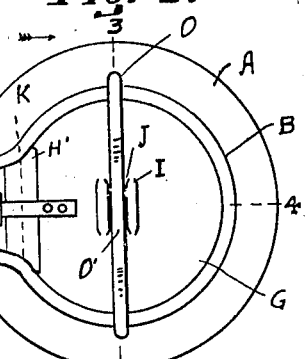
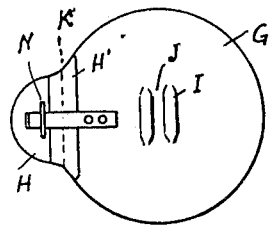
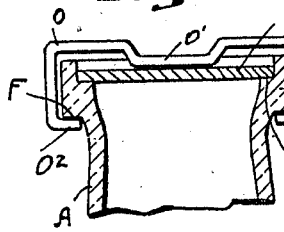
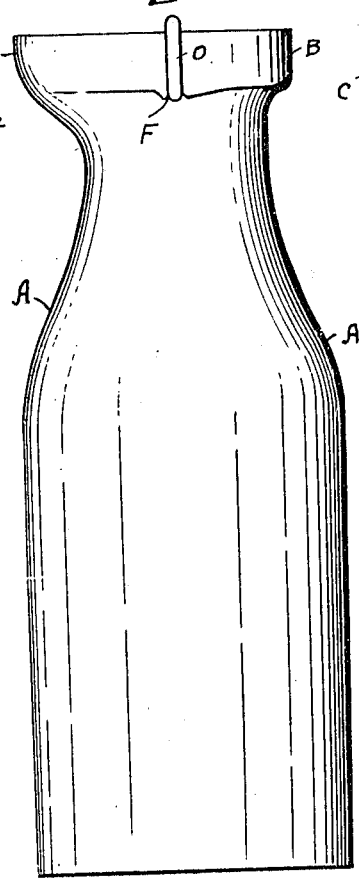
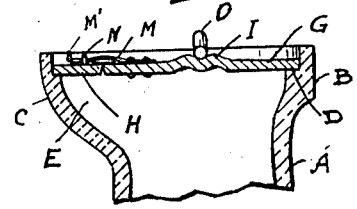
WITNESSES:
Ethel L. Lister.
Robert E. Scott.
INVENTOR
GEORGE E. CLEVELAND
BY Thomas L. Ryan
ATTORNEY

UNITED STATES PATENT OFFICE.

GEORGE E. CLEVELAND, OF FAIRMOUNT, INDIANA.

CONTAINER.

950,475.   Specification of Letters Patent.   Patented Mar. 1, 1910.

Application filed February 15, 1909. Serial No. 477,936.

*To all whom it may concern:*

Be it known that I, GEORGE E. CLEVELAND, a citizen of the United States, and a resident of the city of Fairmount, in the county of Grant and State of Indiana, have invented a new and useful Container, of which the following is a specification.

The objects of this invention are to provide a container which will be capable of being thoroughly cleansed, and easily closed and sealed, and from which the contents may be easily poured.

For the handling and transportation of milk, glass containers or bottles hitherto devised are so formed that a coverlet made of paper may be secured in the top or neck of the container. Objections to the forms of container and the coverlet therefor, as hitherto devised, are that the coverlet will withstand no substantial pressure from within, is difficult to remove or to replace, and unless it is entirely removed will not permit any of the contents to be poured from the container. Other objections are that in pouring, the tendency of the contents is to run or drip down the side of the container.

The aforesaid objections are overcome and the objects of my invention are accomplished by the structure, combination and arrangement of parts described in this specification, defined clearly in the appended claims, and illustrated in the accompanying drawings.

Similar characters of reference refer to corresponding parts throughout the several views.

Figure 1 designates a side view of my new container. Fig. 2 is a plan view. Fig. 3 is a transverse sectional view taken on the line 3—3 Fig. 2. Fig. 4 is a transverse sectional view taken on the line 4—4 Fig. 2. Fig. 5 is a plan view and Fig. 6 is a side view of the coverlet removed. Fig. 7 is a transverse sectional view; and Fig. 8 is a plan view of a modified form of top portion for my improved container.

The general form of the body portion of the container shown in this disclosure of my invention is that of an ordinary milk bottle. The upper portion of the container A is terminated by a ring B of suitable depth and sectional area for proper strength and rigidity, and which ring has the distended portion C. The internal edge of said ring has the ledge D, the line of which extends concentrically with the outer edge of the ring. The mouth E as shown in Fig. 4 is formed by the distention C through which mouth the contents of the container may be poured. Upon the ledge D is adapted to reside the coverlet.

A modified form of top portion for my improved container is shown in Fig. 7 and Fig. 8. In this modified form the ledge D is circular and is capable of receiving any standard form of circular coverlet, the mouth $E^1$ being above the ledge and adapted to perform the same function for facilitating the pouring from the container, as the mouth E. The bottom edges of the ring at the opposite sides thereof are beveled gradually downwardly, the line of said bevels being terminated by the offsets F the functions of which will be presently referred to.

By the peculiar form and construction of container as just described the container is capable of the reception of a coverlet and means to fasten the coverlet in position. The mouth E performs the function of a spout and facilitates the emptying of the container.

G designates the coverlet. This coverlet is of suitable outline so that it will fit freely in the ring B; the nose H will cover the mouth C as shown in Fig. 2 and in Fig. 4. This coverlet is made of fiber material such as papier mâché or pasteboard and near its central portion are provided the ridges I which provide the groove J, the function of which will be presently described. As shown by the dotted line K a slit in the coverlet on its bottom side extends across the coverlet whereby the nose H is free to be moved upwardly in a hingelike manner. To reinforce this portion of the coverlet a linen strip H' cemented properly in position may be used.

M designates a slender leaf spring of the form as shown in Fig. 4. The fixed end of the spring is secured to the coverlet by rivets, and the free end which has the upturned lip $M^1$ passes under a wire staple N carried by the nose H. By this arrangement the nose will be retained normally in snug engagement with the ledge, and at the same time it may be easily lifted and the container accordingly opened by raising the spring M by the lip $M^1$. It will be understood that the spring M need have the resiliency only necessary to urge the nose in alinement with the body portion of the coverlet. It is not intended that this coverlet shall last a great length of time and the construction has been perfected as shown, to afford a coverlet that will be easy of application to position and easy of manipulation and which will be inexpensive to construct.

To fasten the coverlet in position I provide the snap O. This snap is made of spring wire and bent into such form, that when the central portion $O^1$ rests in the groove J of the coverlet, the prongs $O^2$ will be free to slide along the bevel of the ring B and when brought into central position the prongs will snap into the offsets F. This operation besides locking the snap in position will hold the coverlet firmly on the ledge D and the container will be effectively sealed. At the same time the mouth may be easily opened by raising the spring M.

It will be observed that there are no members, parts or projections of my improved container to render the container objectionable for packing or handling, as no part of the top portion extends beyond a line perpendicularly above the outline of the body portion of the container.

What I claim as my invention and desire to secure by Letters Patent of the United States, is—

1. A container having the upper open portion thereof provided with an internal continuous ledge, a coverlet to rest on the said ledge, provided with a line of flexure across same there being a spring arranged on the upper side of said coverlet to maintain the same unflexed or straight, a resilient member to co-engage the upper end portion of the container and the coverlet at a point aside from the line of flexure thereof to hold the coverlet firmly against the said ledge.

2. A container having the upper open portion thereof provided with an internal continuous ledge, a coverlet to rest on the said ledge provided with a line of flexure across the same dividing the coverlet into two parts hingedly connected together, a leaf spring having its one end secured to one part of said coverlet and its free end connected loosely to the other part of said coverlet, a resilient member to co-engage the upper end of the container and that part of the coverlet to which the leaf spring is rigidly secured, substantially as described.

3. A container having the upper portion thereof in the form of a ring having an internal continuous ledge, a coverlet to rest on said ledge provided with a line of flexure across the said coverlet aside from the center thereof there being a spring arranged on said coverlet to exert a downward pressure, and a resilient member to co-engage the coverlet and the ring to hold the former firmly against the said ledge.

4. A container having the upper portion thereof in the form of a ring there being a distention therein to form a mouth the walls of the said container being sloped downwardly to form a throat underneath said mouth, and the said ring having an internal continuous ledge, a coverlet to rest on said ledge and having a nose thereon to cover said mouth the base of the said nose having flexible connection with the body portion of said coverlet and there being a spring arranged on said coverlet to exert a downward pressure on said nose, and a spring wire member to co-engage the ring and the body portion of the coverlet to hold the latter against the said ledge.

5. A container having the upper portion thereof in the form of a ring the lower edges thereof being beveled downwardly on its opposite sides, each of said bevels being terminated with an offset, and there being a distention provided in the said ring to form a mouth and the walls of the said container being sloped downwardly to form a throat underneath the said mouth and the said ring having an internal continuous ledge, a coverlet to rest on said ledge and having a nose thereon to cover the said mouth, the base of said nose having a flexible connection with the body portion of said coverlet, a leaf spring having its one end secured to the body portion of the coverlet and its free end provided with an upturned lip and loosely connected to the nose of the coverlet, a spring wire member having its ends inturned to engage the offsets in the underside of the ring and having its central portion to engage the said coverlet, substantially as described.

In testimony whereof I sign my name to this specification in the presence of two subscribing witnesses.

GEORGE E. CLEVELAND.

Witnesses:
 THOMAS L. RYAN,
 ETHEL L. LISTER.